UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

PROCESS OF MOLDING.

1,286,370.      Specification of Letters Patent.      Patented Dec. 3, 1918.

No Drawing.      Application filed July 3, 1914. Serial No. 848,803.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Processes of Molding, of which the following is a specification.

My invention relates to molding processes, and it has special reference to processes that are adapted to the manufacture of molded electrical insulation.

The objects of my invention are to prepare novel, effective and inexpensive materials of high insulating efficiency and to mold such materials into shapes without the application of heat.

My novel process of preparing molded material depends upon the property, common to nearly all insoluble gums, pitches, synthetic resins and other binding substances, of swelling and softening slightly under the influence of solvents, even though they are not actually soluble in such solvents. If, for example, an infusible and insoluble resinous condensation product, such as bakelite, or a natural insoluble pitch, such as gilsonite or wurtzilite, is treated in a powdered condition with one of the common solvents, such as methyl alcohol or benzol, it will absorb a small quantity of the solvent and the particles of the resin will swell and soften slightly. This slight swelling and softening are sufficient to enable the material to be compressed into a coherent mass, the particles of the material being apparently welded or knit together under pressure.

Only a very small amount of solvent is needed, preferably only enough to effect the swelling and softening just described without actually wetting the powder, which, after treatment with the solvent, may still be pulverulent and dry to the touch. However, under the pressures commonly employed in manufacturing molded shapes from plastic material, the powder will cohere perfectly and yield highly satisfactory molded articles. On account of the small quantity of solvent that is present, the shrinkage upon molding is exceedingly low.

It is usually desirable to mix with the resin, or other binder under treatment, a suitable quantity of inert filler, such as finely divided asbestos or wood flour, as is commonly done when molding with the compositions heretofore employed.

My process may be applied to a wide variety of binders and solvents, and I do not desire to be restricted to the use of insoluble binding substances, such as the bakelite or wurtzilite referred to above, since soluble binders are equally applicable for use in my process. The use of soluble binders may often be preferable, since a smaller amount of binder, in proportion to the filler present, is necessary to form the molded articles than when the binder is insoluble.

After the molded articles are pressed in the cold, the small amount of solvent present in the molded articles will be found to be near the surface, and can be wholly expelled by subjecting the molded articles to a gentle heat for a short time.

The nature and amount of solvent to be added to the powdered binder and filler vary, of course, according to the nature of the binder, and according to whether the solvent actually dissolves the binder or only has the effect of causing it to swell and soften. The proper amount of solvent to be used must be determined in each case, which may conveniently be done by mixing a small portion of the powder with the solvent and adding small amounts of each, with constant agitation, until the mass assumes a powdered condition and is free from lumps. The binder may be applied as a spray of liquid or, if it is of a readily vaporizable nature, it is preferable to apply it in the form of vapor, in which case the mixture of the pulverized solvent and filler may conveniently be tumbled in a ball mill to which vapors of the solvent are supplied.

In carrying out my process with a specific binder, that solvent should be selected to the action of which the given binder is most susceptible. Thus, I prefer to use benzol as the solvent when coal-tar pitch is the binder, and methyl alcohol when shellac is the binder, while for bakelite, I prefer to use a mixture of benzol and methyl alcohol.

According to one modification of my invention, I prepare cold-molded articles with coal tar pitch as the binder. The coal tar pitch is first heated at about 260° or 300° C., in order to expel its easily volatile constituents. It is then pulverized, mixed with any suitable filler, moistened with a small amount of solvent in the manner described above, and molded in the cold. Any of the well known solvents may be employed in connection with coal tar pitch, but at present, I prefer to use benzol as the solvent and to apply it in the form of vapor, while the pulverized pitch and filler are tumbled in a ball mill.

In the subjoined claims, the expression "resinous substance" is to be understood as a generic term, including all resins, gums, gum-resins, synthetic resins, pitches, tannins, and all other substances, whether soluble or insoluble, that can be used as binders in the preparation of plastic compositions.

The examples and substances which I have mentioned are intended to be merely illustrative, and numerous other applications of my process will readily suggest themselves to persons skilled in the art. It is to be understood, therefore, that my invention comprehends broadly all processes in which a discrete substance is caused to cohere by the addition of a small amount of liquid, which affects it either as a solvent or only as a swelling and softening agent. It is also to be understood that no limitations are to be imposed upon my invention other than those indicated in the appended claims.

I claim as my invention:

1. A process of molding that comprises heating a resinous substance to drive off any easily volatile constituents, finely dividing the substance so heated, treating the said finely divided substance with a liquid capable of causing it to swell and soften and subjecting the resultant mass to pressure.

2. The process of molding that comprises heating a pitch to drive off its easily volatile constituents, finely-dividing the residue, treating the said finely-divided residue with a liquid capable of causing it to swell and soften, and subjecting the resulting mass to pressure.

3. A process of molding that comprises heating a pitch to drive off its easily volatile constituents, finely-dividing the residue, treating the said finely-divided residue with a liquid capable of causing it to swell and soften, the amount of said liquid being sufficient to swell and soften the said residue without wetting it, and subjecting the resulting mass to pressure.

4. A process of molding that comprises heating coal tar pitch to drive off its easily volatile constituents, finely-dividing the residue, treating the said finely-divided residue with a liquid capable of causing the said residue to swell and soften, and subjecting the resulting mass to pressure.

5. A process of molding that comprises heating coal tar pitch to drive off its easily volatile constituents, finely-dividing the residue, treating the said finely-divided residue with a liquid that is capable of causing the said residue to swell and soften, the amount of the said solvent being only sufficient to swell and soften the said residue without wetting it, and subjecting the resulting mass to pressure.

6. A process of molding that comprises heating coal tar pitch to drive off its easily volatile constituents, finely-dividing the residue, treating the said finely-divided residue with benzol and subjecting the resulting mass to pressure.

7. A process of molding that comprises heating coal tar pitch to drive off its easily volatile constituents, finely-dividing the residue, treating the resulting powder with vapors of benzol until the particles composing the powder are swelled and softened but not wetted, and subjecting the resulting mass to pressure.

In testimony whereof I have hereunto subscribed my name this 30th day of June, 1914.

JAMES P. A. McCOY.

Witnesses:
W. H. KEMPTON,
B. B. HINES.